(12) United States Patent
Delaney et al.

(10) Patent No.: US 11,568,095 B2
(45) Date of Patent: Jan. 31, 2023

(54) DEVICE DEACTIVATION BASED ON BEHAVIOR PATTERNS

(71) Applicant: Micron Technology, Inc., Boise, ID (US)

(72) Inventors: Claudia A. Delaney, Garden City, ID (US); Elsie de la Garza Villarreal, Nampa, ID (US); Madison E. Wale, Boise, ID (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 310 days.

(21) Appl. No.: 16/871,198

(22) Filed: May 11, 2020

(65) Prior Publication Data

US 2021/0350034 A1   Nov. 11, 2021

(51) Int. Cl.
*G06F 21/88* (2013.01)
*G06N 20/00* (2019.01)
(Continued)

(52) U.S. Cl.
CPC ............ *G06F 21/88* (2013.01); *G06F 21/316* (2013.01); *G06N 20/00* (2019.01);
(Continued)

(58) Field of Classification Search
CPC ... H04W 12/126; H04W 12/08; H04W 12/12; H04W 12/68; H04W 12/30; H04W 4/02;
(Continued)

(56) References Cited

U.S. PATENT DOCUMENTS 7,809,353 B2 * 10/2010 Brown ...................... H04L 9/00
 455/410
9,220,011 B1 * 12/2015 Annan ................ H04W 12/082
(Continued)

FOREIGN PATENT DOCUMENTS

AU      2016100138 A4 *  3/2016
KR       101195025 B1    10/2012
(Continued)

OTHER PUBLICATIONS

"Find your device using Android Device Manager", obtained online from <https://web.archive.org/web/20150514080347/https://support.google.com/accounts/answer/6160491?hl=en>, retrieved on May 7, 2022 (Year: 2015).*

(Continued)

*Primary Examiner* — Jeffery L Williams
*Assistant Examiner* — Zhimei Zhu
(74) *Attorney, Agent, or Firm* — Perkins Coie LLP

(57) ABSTRACT

Embodiments are described for a pattern-based control system that learns and applies device usage patterns for identifying and disabling devices exhibiting abnormal usage patterns. The system can learn a user's normal usage pattern or can learn abnormal usage patterns, such as a typical usage pattern for a stolen device. This learning can include human or algorithmic identification of particular sets of usage conditions (e.g., locations, changes in settings, personal data access events, application events, IMU data, etc.) or training a machine learning model to identify usage condition combinations or sequences. Constraints (e.g., particular times or locations) can specify circumstances where abnormal pattern matching is enabled or disabled. Upon identifying an abnormal usage pattern, the system can disable the device, e.g., by permanently destroying a physical component, semi-permanently disabling a component, or through a software lock or data encryption.

19 Claims, 5 Drawing Sheets

(51) Int. Cl.
*G06F 21/31* (2013.01)
*H04M 1/72448* (2021.01)
*H04M 1/72454* (2021.01)
*H04M 1/72463* (2021.01)
*H04M 1/72451* (2021.01)
*H04M 15/00* (2006.01)

(52) U.S. Cl.
CPC ... *H04M 1/72448* (2021.01); *H04M 1/72451* (2021.01); *H04M 1/72454* (2021.01); *H04M 1/72463* (2021.01); *H04M 15/47* (2013.01)

(58) Field of Classification Search
CPC ..... H04W 4/029; H04W 88/02; H04W 12/61; H04W 12/63; H04W 12/65; H04W 24/00; H04W 4/025; H04W 4/027; H04W 4/90; H04W 48/02; H04W 8/183; G06F 21/88; G06F 2221/2111; G06F 21/305; G06F 21/316; G06F 2221/2143; H04M 1/72463; H04M 15/58; H04M 1/72457; G06N 20/00; G06N 3/0454; G06N 3/08
See application file for complete search history.

(56) References Cited

U.S. PATENT DOCUMENTS

| | | | | |
|---|---|---|---|---|
| 9,258,715 | B2* | 2/2016 | Borghei | H04M 1/72403 |
| 10,887,759 | B1* | 1/2021 | Wang | H04W 4/80 |
| 10,909,836 | B2 | 2/2021 | Cho et al. | |
| 2006/0145841 | A1* | 7/2006 | Daurensan | G08B 21/0297 340/539.22 |
| 2009/0049544 | A1* | 2/2009 | Kashi | H04L 9/3226 726/19 |
| 2009/0253410 | A1* | 10/2009 | Fitzgerald | H04W 12/30 455/414.1 |
| 2012/0237908 | A1* | 9/2012 | Fitzgerald | H04W 4/029 434/236 |
| 2013/0137376 | A1* | 5/2013 | Fitzgerald | H04W 8/245 455/41.3 |
| 2016/0066189 | A1* | 3/2016 | Mahaffey | H04M 15/7652 455/405 |
| 2016/0142894 | A1* | 5/2016 | Papakonstantinou | G16H 40/67 455/404.1 |
| 2016/0360376 | A1* | 12/2016 | Bostick | H04M 1/72454 |
| 2017/0264383 | A1* | 9/2017 | Reddy | H04W 68/005 |
| 2019/0020676 | A1* | 1/2019 | Laughlin | G06F 21/316 |
| 2019/0095313 | A1 | 3/2019 | Xu et al. | |
| 2019/0163973 | A1* | 5/2019 | Keohane | G06N 3/084 |
| 2020/0242912 | A1* | 7/2020 | Cho | G08B 21/24 |

FOREIGN PATENT DOCUMENTS

| | | |
|---|---|---|
| KR | 101737095 B1 | 5/2017 |
| KR | 102080432 B1 | 2/2020 |

OTHER PUBLICATIONS

International Application No. PCT/US2021/028586—International Search Report and Written Opinion, dated Jul. 27, 2021, 12 pages.

* cited by examiner

DEVICE DEACTIVATION BASED ON BEHAVIOR PATTERNS

TECHNICAL FIELD

The present disclosure is directed to identifying individual or categorical device usage patterns for automatically disabling devices.

BACKGROUND

It is estimated that over 70 million mobile devices are stolen each year, and less than 7% of these are recovered. In addition, devices are becoming ever more valuable, often costing thousands of dollars to replace. However, the cost of a stolen device often goes far beyond the monetary value of the device itself. The theft of personal information, financial information, credentials to other systems, etc. can far outweigh the cost of replacing stolen hardware.

There are numerous systems aimed at combating device theft. For example, many devices employ encryption technologies, authentication procedures, and biometrics to protect device data. However, the high value of devices and recoverable data available to device thieves results in the number of stolen devices rising each year.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
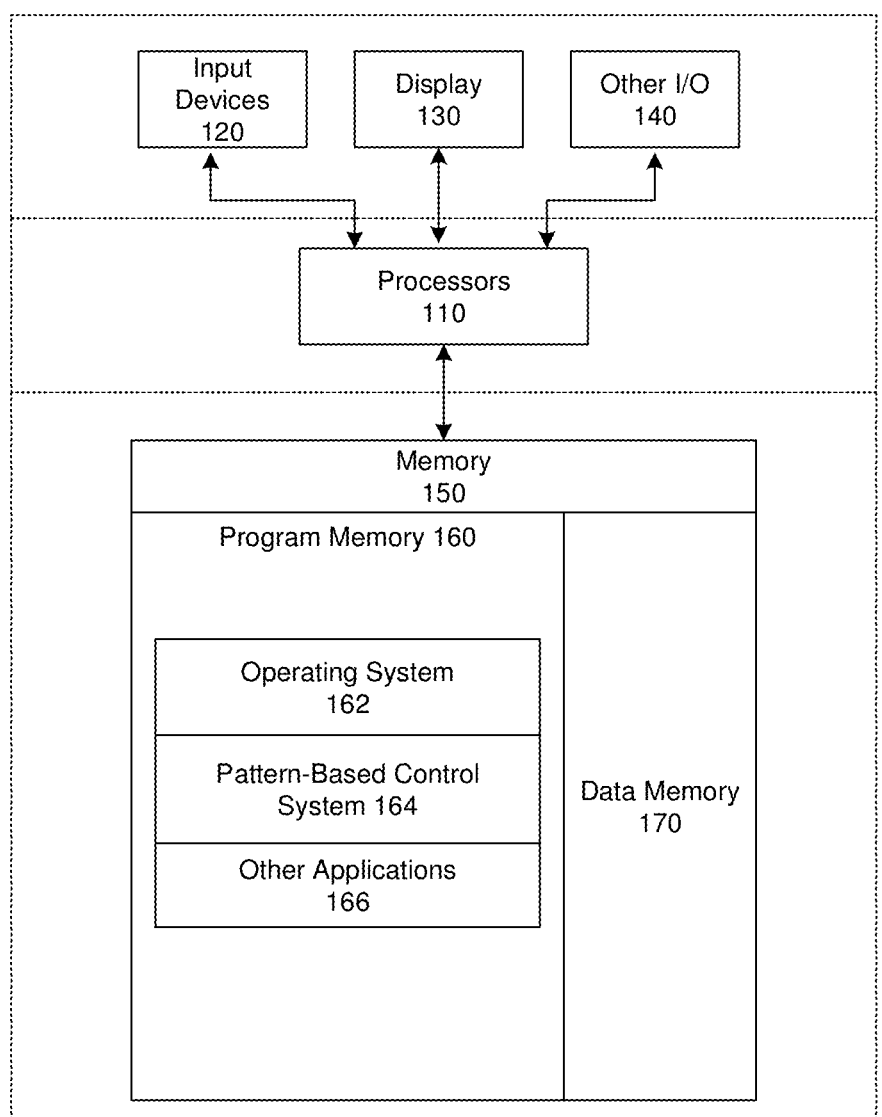
FIG. 1 is a block diagram illustrating an overview of devices on which some implementations can operate.

Embodiments are described for a pattern-based control system that learns and applies device usage patterns for identifying and disabling devices exhibiting abnormal usage patterns, such as patterns for stolen devices. In various implementations, disabling the device can include permanently destroying a physical component of the device, semi-permanently disabling a component of the device (e.g., requiring third-party override to re-enable), or temporarily disabling the device (e.g., through a software lock or encryption that can be reversed with a password or other authentication procedure).

In some implementations, the pattern-based control system can learn a user's normal usage pattern and disable the device when a usage pattern is identified that is a threshold amount different from the normal usage pattern. In other implementations, the pattern-based control system can learn abnormal usage patterns, such as a typical usage pattern for a stolen device and can disable the device when such an abnormal usage pattern is found.

In some cases, the pattern-based control system can learn a usage pattern as a set of values (e.g., binary values for whether particular activities have occurred, particular values for options in categories of activities, value ranges, etc.) for usage conditions. In other implementations, the pattern-based control system can use usage condition values as input to a machine learning model that can produce a usage pattern match estimation. A machine learning model can be trained to identify "stolen device" usage patterns based on usage patterns seen in other stole devices or based on activities known to commonly occur when a device is stolen (such as making multiple purchases, mining personal data, and swapping a SIM card). A machine learning model can also be trained to learn a particular user's typical usage pattern, e.g., by monitoring device usage and applying the activities as training data to the model, assuming a non-stolen device until the model has enough use examples to have built up the ability to identify the typical usage pattern.

A "machine learning model" or "model," as used herein, refers to a construct that is trained using training data to make predictions or provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data. Examples of models include: neural networks, deep neural networks, support vector machines, decision trees, Parzen windows, Bayes, probability distributions, and others. Models can be configured for various situations, data types, sources, and output formats.

In various implementations the pattern-based control system can monitor a variety of current usage conditions. The pattern-based control system can determine a binary value for whether particular activities are occurring or identify individual values or value ranges for the circumstance of an activity. Such usage conditions can include, for example, values for identifications of locations, changes in settings, data access events (e.g., passwords, personal data), application usage amounts or sequences, bandwidth usage events or patterns, device movement patterns (e.g., inertial measurement unit or "IMU" data), a SIM change event, purchase events, identifications of a current user facial pattern, etc.

In some implementations, a user can apply constraints on disabling a device, such as never disabling the device when at a particular known location, enabling abnormal usage pattern matching in certain circumstances (e.g., when the user indicates she is traveling), disabling checking for abnormal usage patterns in certain circumstances (e.g., if the device is lent to another user), enabling or disabling usage patterns matching at certain times of day and/or for certain dates, etc.

In some implementations, the pattern-based control system can provide an option for the user to override device disabling once an abnormal usage pattern is identified. For example, the pattern-based control system can provide one or more alerts through the device or by sending notifications to other accounts (such as an email account or texting a backup device). The alert may require an authentication, following which the pattern-based control system can cancel disabling of the device. In some implementations, canceling disabling of the device can cause the pattern-based control system to change the matched abnormal usage pattern or retrain the machine model to not identify the usage pattern that caused the notification.

Upon identifying an abnormal usage pattern (and if no override is provided) the pattern-based control system can disable the device. In some implementations, disabling the device includes permanently destroying a physical component of the device. For example, the pattern-based control system can overload fuses, corrupt memory, overheat a processor, etc. In other implementations, disabling the device includes semi-permanent disabling a component of the device such as turning off or disabling a device (e.g., memory) controller, disconnecting hardware components, etc. Such semi-permanent disabling may require a third-party (such as a manufacturer, network provider, etc.) to re-enable the device. In yet other implementations, the disabling can be non-permanent, e.g., through a software lock or encryption, which can be undone through an authentication procedure. In some implementations, the level of device disabling can be based on a severity of abnormal activities or a confidence value of the match to the abnormal usage. For example, if the pattern-based control system has a high confidence value for the device being stolen, it can permanently disable the device, but with a lower threshold confidence value, the pattern-based control system may only semi-permanently disable the device.

There are existing systems aimed at reducing the security exposure due to device theft. These systems either rely on pre-established security policies, such as requiring strong passwords, data encryption, or local sandboxes for sensitive applications, or they rely on remote control, such as remote credential removal or memory wiping upon a notification from a device owner that the device was stolen. However, these existing systems suffer from multiple drawbacks. Pre-established security policies, to remain secure, generally require users to comply with guidelines such as not reusing passwords and not entering passwords where they can be overseen. Remote control systems require a user to realize their device has been stolen and contact (without having access to their stolen device) a remote device administrator to perform the data removal. In addition to these security issues, both types of existing systems fail to adequately disincentivize device theft, as the devices retain significant value following typical actions a thief can take such as a simple factory reset, replacing a storage system, and/or replacing a SIM card.

The disclosed technology is expected to overcome these drawbacks of existing systems. By providing automated device disabling based on learned usage patterns, security is improved through not relying on either user guideline compliance or prompt administrator notification of theft. Instead, device disabling occurs automatically when an abnormal usage pattern is detected. In addition, by providing an automated system for disabling a device in a manner which a thief is unable to overcome (e.g., by damaging device hardware or disabling hardware controllers—actions which performing a factory reset or replacing a storage system do not overcome), devices become much less attractive to steal and thus device theft may decrease.

Several implementations are discussed below in more detail in reference to the figures. FIG. 1 is a block diagram illustrating an overview of devices on which some implementations of the disclosed technology can operate. The devices can comprise hardware components of a device 100 that learn device usage patterns. The same device 100 or another version of device 100 can detect abnormal usage pattern matches and, unless a constraint is active or an override occurs, disable the device 100. Device 100 can include one or more input devices 120 that provide input to the processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, pattern-based control system 164, and other application programs 166. Memory 150 can also include data memory 170, e.g., device usage patterns, constraint settings, override notification templates, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
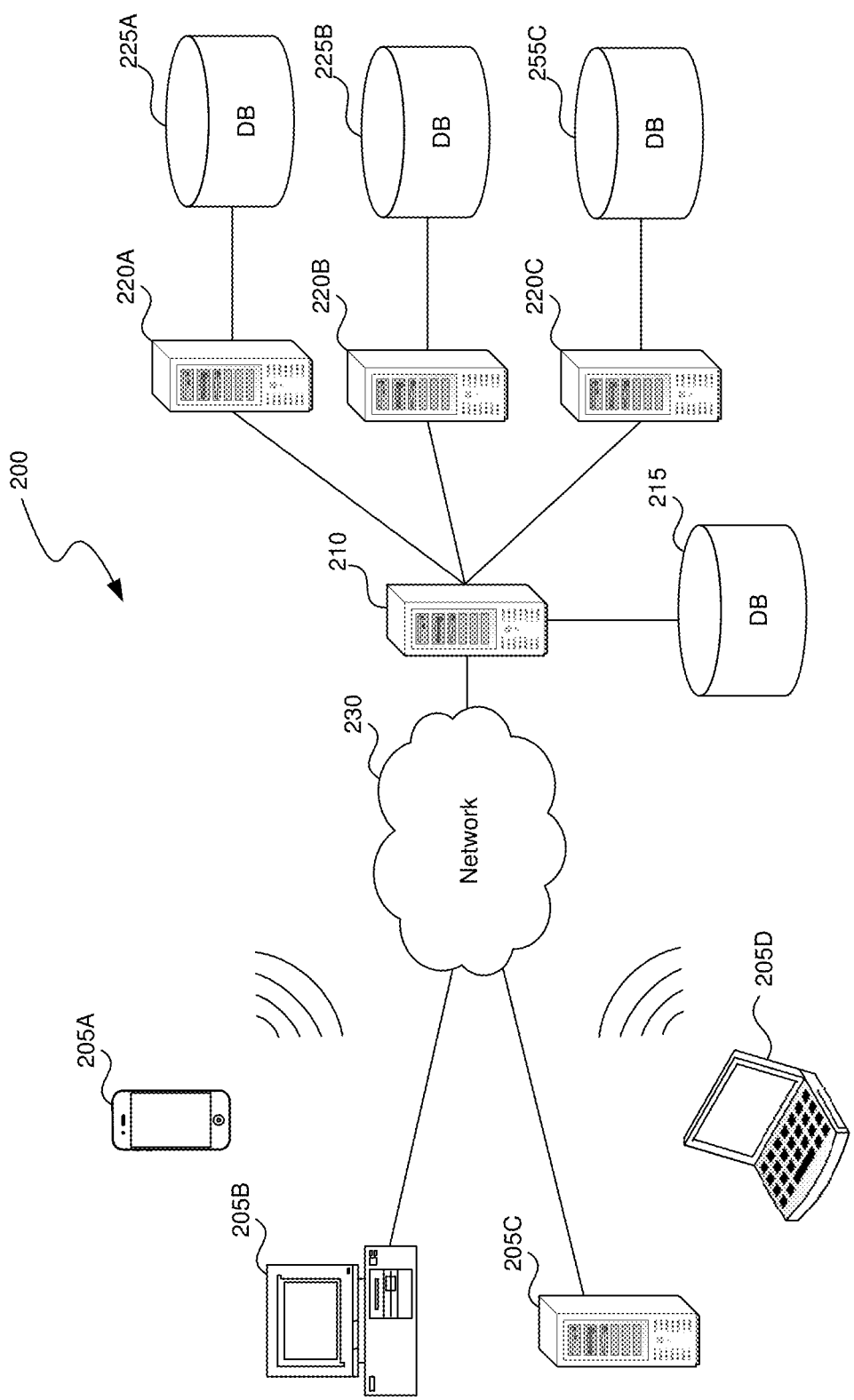
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as typical uses of devices following a theft, normal usage patterns, constraint settings, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
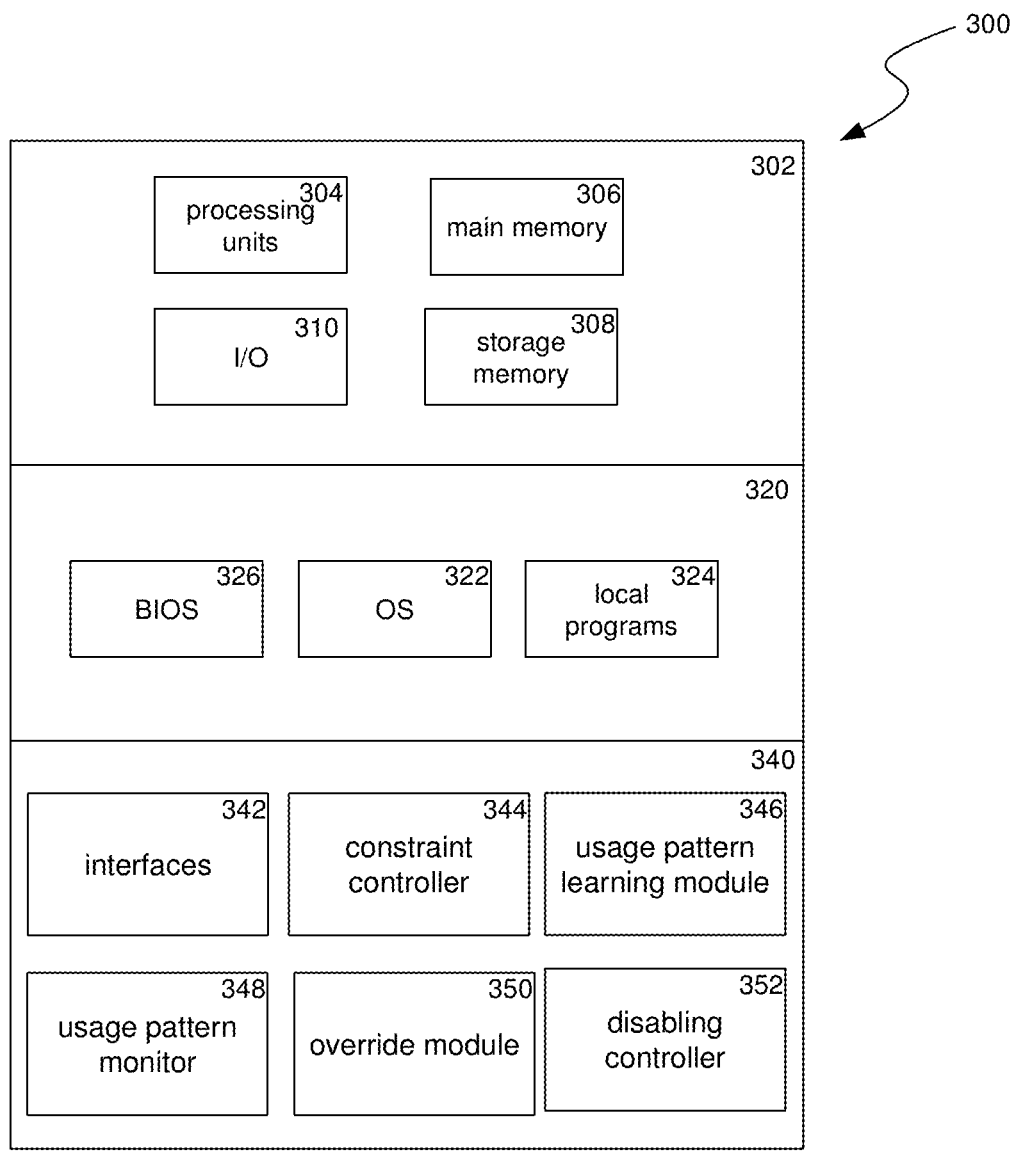
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), main memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include constraint controller 344, usage pattern learning module 346, usage pattern monitor 348, override module 350, disabling controller 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions within a controller. For example, specialized components 340 may be aspects of a controller that resides on an application processor, modem processor, ASIC, FPGA, or the like. In some examples, specialized components 340 is a memory controller, represented as an IP block of a layout or design, in one of the foregoing.

Constraint controller 344 can determine if any constraints that specify circumstances where abnormal pattern matching is disabled or enabled, are active. Examples of the circumstances that constraints specify can include unsafe or safe geographic zones where abnormal pattern matching is enabled or disabled; unsafe or safe times of day where abnormal pattern matching is enabled or disabled; unsafe or safe dates where abnormal pattern matching is enabled or disabled, manual activation or deactivation of abnormal pattern matching, etc. Additional details on constraints from abnormal pattern matching are provided below in relation to block 404 and software module 552.

Usage pattern learning module 346 can learn device usage patterns corresponding to normal usage for a particular user or usage typically seen (or expected) on a stolen device. In various implementations, learning usage patterns can include training a machine learning model using usage conditions tagged as either being for or not for a particular user or tagged as occurring or not occurring in a stolen device. In other implementations, learning usage patterns can include human selections of sets of usage conditions or selecting usage conditions based on statistical analysis (e.g., where particular uses conditions occur above a threshold amount of times, they can be added to the selected set of usage conditions). Additional details on learning usage patterns are provided below in relation to block 402 and software module 532.

Usage pattern monitor 348 can obtain the usage patterns (either as a machine learning model or a set of usage conditions) leaned by usage pattern learning module 346. Usage pattern monitor 348 can also obtain current usage conditions for the device 300 (e.g., from components 320 via interfaces 342) and apply them against the obtained usage patterns to determine whether an abnormal usage pattern is occurring. Additional details on monitoring current usage conditions for abnormal usage patterns are provided below in relation to block 406, software module 554, and neural network 506.

Override module 350 can, when an abnormal usage pattern is detected by usage pattern monitor 348, solicit an override from a user, such as by providing a notification on the device 300 or by sending a message to another system such as an email account, phone number, or device administration system. If the user provides the override within a set time limit, disabling the device can be cancelled. Additional details on overrides are provided below in relation to block 408 and software module 556.

Disabling controller 352 can disable the device 300 when an abnormal usage pattern is detected by usage pattern monitor 348 and no override is received by override module 350 within the set time limit. Disabling the device 300 can include permanently destroying a physical component of the device 300, semi-permanently disabling a component of the device 300 (e.g., requiring third-party override to re-enable), or temporarily disabling the device 300 (e.g., through a software lock or encryption). In some implementations, the level of disabling can be based on a mapping of confidence values for abnormal usage (provided by usage pattern monitor 348) to types of disabling. Additional details on disabling a device are provided below in relation to block 410 and action 590.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
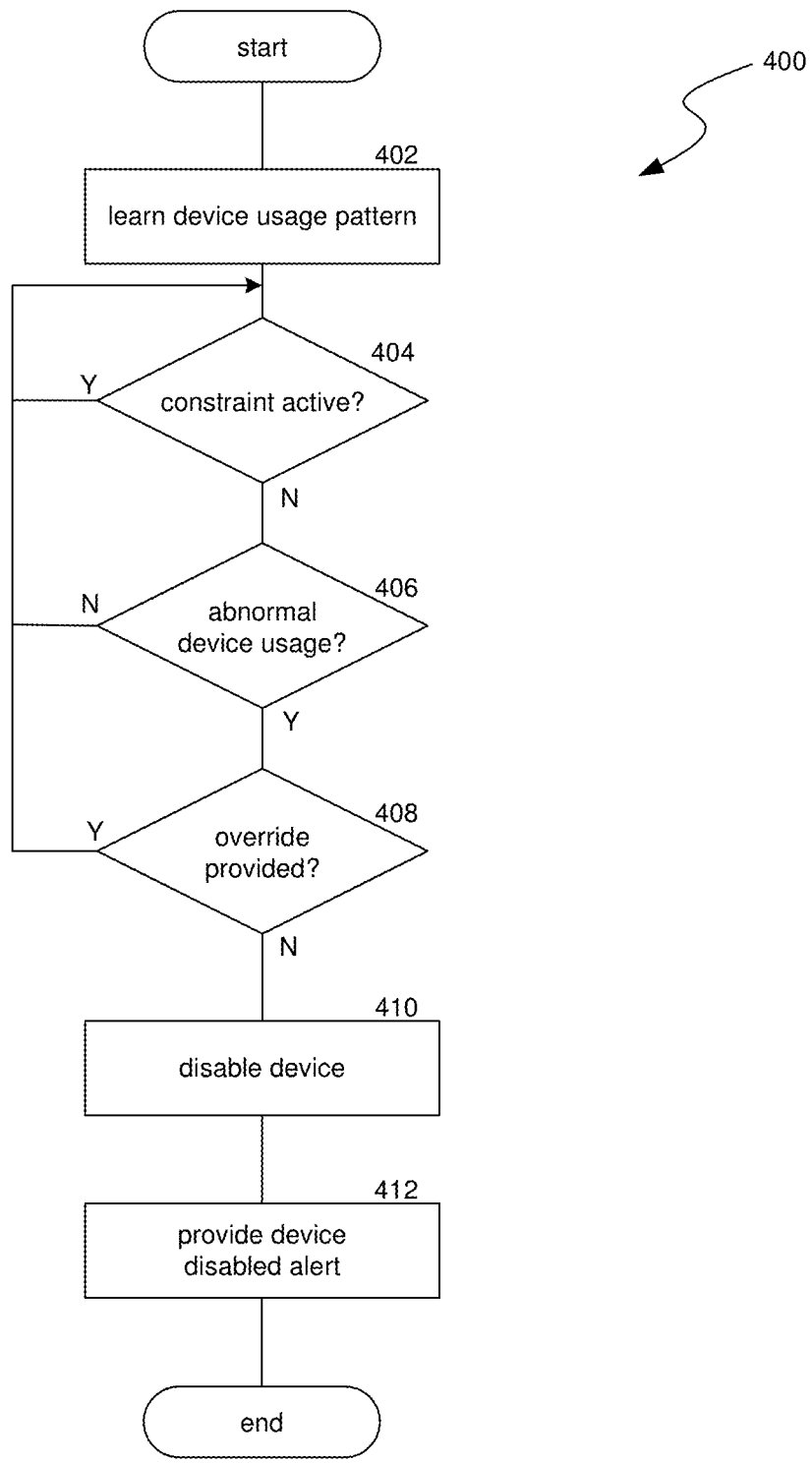
FIG. 4 is a flow diagram illustrating a process used in some implementations for learning and applying device usage patterns to disable likely stolen devices.

FIG. 4 is a flow diagram illustrating a process 400 used in some implementations for learning and applying device usage patterns to disable likely stolen devices. Parts of process 400 can be performed at different times. In some implementations, block 402, for learning device usage patterns, can be performed incrementally as a user uses a device. In other implementations, block 402 can be performed ahead of time using a set of training items indicating whether or not a particular use is part of abnormal device usage (e.g., for a stolen device). These cases allow process 400 to obtain a machine learning model by training it. In other cases, block 402 can be performed on a device different from the device that performs blocks 404 through 412. For example, a remote device can train a machine learning model to recognize usage patterns for stolen devices, and that machine learning model can be obtained by another device which uses the model to check for the usage pattern.

While in some cases portions of process 400 can be performed with the normal processing elements and/or memory of a device, in other implementations, at least some parts of process 400 (e.g., blocks 404 through 412) can be performed using specialized security hardware for example a processor and/or memory separate from the processor and/or memory used for normal operations (e.g., that execute the operating system) of the device. This can allow the device to monitor for abnormal usage despite exceptional circumstances such as a factory data reset. Similarly, in some implementations, part of process 400 can be performed remotely, by providing current usage conditions over a network to a system performing the abnormal usage monitoring. In some circumstances, the device being monitored can include a default to disable the device if a verification is not periodically received from the remote system, preventing thieves from simply disabling communication to overcome the device disabling procedures.

At block 402, process 400 can learn a device usage pattern. A device usage pattern can be based on usage conditions, such as a current location, changes made to settings, particular data access events (e.g., passwords or personal data access), application uses, bandwidth patterns, physical device movement (e.g., IMU data), a SIM card change event, financial events (e.g., e-commerce purchases), current user facial recognition data, other user I/O events, network traffic, etc. A usage pattern can be a typical usage pattern (e.g., typical use by a particular user) or an abnormal usage pattern (e.g., use that is typical for a stolen device).

In some implementations, a device usage pattern can be learned by training a machine learning model to recognize when usage conditions amount to a normal or an abnormal usage pattern. In some implementations, the machine learning model can be a neural network with multiple input nodes that receive usage conditions. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained for identifying typical or abnormal usage patterns, can be used as a gauge of whether a usage is typical or abnormal. As another example, the machine learning model can be a deep neural network and/or part of the neural network can have an internal state, allowing the neural network to identify usage patterns over time (e.g., a recurrent neural network) or can perform convolutions (e.g. a convolutional neural network). In some implementations, the neural network can be trained to identify abnormal usage patterns with the training data that includes input usage conditions performed by normal users mapped to typical usage output and training data that includes activities observed in devices that have been stolen or activities expected to be performed in stolen devices mapped to abnormal output. In other circumstances, the model can be trained to identify use of a particular user, in which case the training items can be monitored usage conditions by that user mapped to output indicating the use is normal. During training, a representation of the input usage conditions (e.g., as a feature vector) can be provided to the neural network. Output from the neural network can be compared to the desired output mapped to that training item and, based on the comparison, the neural network can be modified, such as by changing weights between nodes of the neural network and/or parameters of the functions used at each node in the neural network or between layers of a deep neural network. After applying each of the training items and modifying the neural network in this manner, the neural network model can be trained to evaluate new usage patterns for whether they are normal or abnormal.

In some implementations, instead of or in addition to machine learning models, at block 402 the pattern-based control system can learn a device usage pattern as a set of usage conditions. For example, an abnormal usage pattern could be set as a change in location to an area never previously visited combined with a password database access followed by a factory data reset.

In some implementations where the learned device usage pattern is particular to a user, the learned device usage pattern can be reset, allowing the device to be transferred to a new user to lean a new typical usage pattern. This reset process can be behind various security features such as a password, biometrics, or may require a third-party connection (such as to a network provider or device manufacturer) to perform the usage pattern reset.

In cases where the usage pattern is learned on a device other than where it will be applied, the device used pattern can be pre-loaded into the device, e.g. by a device manufacturer, or can be provided to the device over a network.

At block 404, process 400 can determine whether a constraint is active. Constraints can limit the circumstances where the pattern-based control system will perform abnormal device usage checking. For example, a user may be able to configure settings to explicitly turn pattern matching on or off or may set circumstances for pattern matching to be automatically enabled or disabled. For example, a user may loan her device to another user but will not want the abnormal usage by the other user to trigger disabling of the device. In this instance, the user can toggle a setting telling the pattern-based control system to stop checking for abnormal usage patterns until the setting is toggled back on. As another example, a user can establish safe geographic zones where abnormal pattern matching is disabled (e.g., at home, work, or auto-learned locations based on the user's routine) or can establish unsafe zones where abnormal pattern matching is enabled (e.g., when traveling or at a location not part of the user's usual routine). Similarly, a user can establish safe or unsafe times or dates to enable or disable abnormal pattern matching (e.g., the user can enable pattern matching for dates when the user is traveling, or the pattern-based control system can automatically identify events on the user's calendar where a theft is more likely to occur). In some cases, the pattern-based control system can automatically identify conditions (e.g., based on a current location, calendar event, or other scenario) for which a heightened security risk exists (e.g., where theft is more likely) and can prompt the user to activate abnormal pattern matching. If a constraint is active (preventing abnormal pattern matching), process 400 can remain at block 404 until the constraint is turned off. If no such constraints are active, process 400 can continue to block 406. In some implementations, no constraint checking is used and process 400 can skip block 404 and proceed directly to block 406.

At block 406, process 400 can detect whether abnormal device usage is occurring. Depending on the type of device usage pattern learned at block 402, comparing current usage conditions to usage patterns can include determining a threshold match between the current usage conditions and a set of usage conditions learned at block 402 or applying the current usage conditions to a machine learning model trained at block 402. In various implementations, identifying abnormal device usage can include determining that current usage conditions do not sufficiently match a normal usage pattern or can include determining that current usage conditions sufficiently match an abnormal usage pattern.

In some implementations, more than one device usage pattern can be used. For example, process 400 can have identified an abnormal device usage pattern for stolen devices and can have identified a typical usage pattern for a particular user (e.g., a separate machine learning model trained for each). Process 400 can combine the output from these two usage patterns to determine whether abnormal device usage is occurring, e.g., by determining abnormal usage when either model provides a confidence value above a threshold, when both models provide a confidence value above a threshold, or when the average determination by both models is above a threshold. In some cases, the output from each of these two models can be weighted, e.g. by static values or by using a third model trained to identify a weight for the output of each of the other two models based on input of the usage conditions. For example, an "is stolen" model can produce an estimation of 73% positive that the device has been stolen based on the current usage conditions, an "is typical usage" model can produce an estimation of 87% that the current usage conditions indicate non-typical usage, and a "weighting model" can provide a 61% weight for the "is typical usage" model and a 39% weight for the "is stolen" model for the current usage conditions. Thus, the overall result can be 73%*39%+87%*61%=81.54%. The threshold for abnormal usage in this example can be 80%, so the result will be a determination that abnormal usage is occurring. If abnormal device usage is not detected, process 400 can return to block 404, but if abnormal device usage is detected, process 400 can continue to block 408.

At block 408, process 400 can determine whether an override for disabling the device has been provided. In response to detecting abnormal device usage, process 400 can provide a warning either on the device or to a separate system (e.g., a specified email account, device administrator, by text to a backup device, etc.) that abnormal device usage has been detected and, unless an override is provided within a threshold amount of time (e.g., 30 seconds, 1, 2, or 5 minutes, etc.), the device will disable itself. Providing an override can include entering a master password, providing a biometric reading, performing a two-factor authentication, etc. In some cases, a provided override can indicate that the abnormal usage match at block 406 was incorrect, and so process 400 can retrain the learned device usage pattern with additional training data including the current usage conditions as a counterexample for abnormal usage. If the override was provided, process 400 can return to block 404, but if no override was provided, process 400 can proceed to block 410. In some implementations, no override checking is used and process 400 can skip block 408 and proceed directly to block 410.

At block 410, process 400 can disable the device for which abnormal usage was detected. In various implications, the disabling can be a permanent disabling of hardware, a semi-permanent disabling outside of data stored in device memory, or can be a change in settings or other memory configuration. For example, permanently disabling hardware can include overloading fuses, corrupting memory, overheating a processor, etc. Semi-permanent disabling can include turning off or disconnecting hardware or disabling a hardware controller. Disabling by changes to settings or other memory configurations can include encrypting a drive, locking a device, or deleting particular sensitive information. In some implementations, the type of disabling that occurs can be based on a confidence score of how likely the device is to have been stolen determined at block 406. For example, a machine learning model can produce a value between zero and one, where the closer the value is to one, the more confident the model is that the current usage conditions indicate abnormal (or normal depending on the way the model was trained) usage. Various thresholds of confidence values can be mapped to different types of disabling, e.g., the higher the confident value is for the current usage indicating the device has been stolen, the more permanent the disabling of the device.

At block 412, process 400 can provide an alert that the device was disabled. For example, a specified email account, phone number, or other system (e.g., an employer information security system), can receive notification that the device has been disabled. In some implantations, the alert can also provide the usage conditions that caused the device to be disabled and/or instructions for re-enabling the device. Process 400 can then end. In some implementations, no deactivation alerts are provided, and process 400 can skip block 412.

Figure 5:
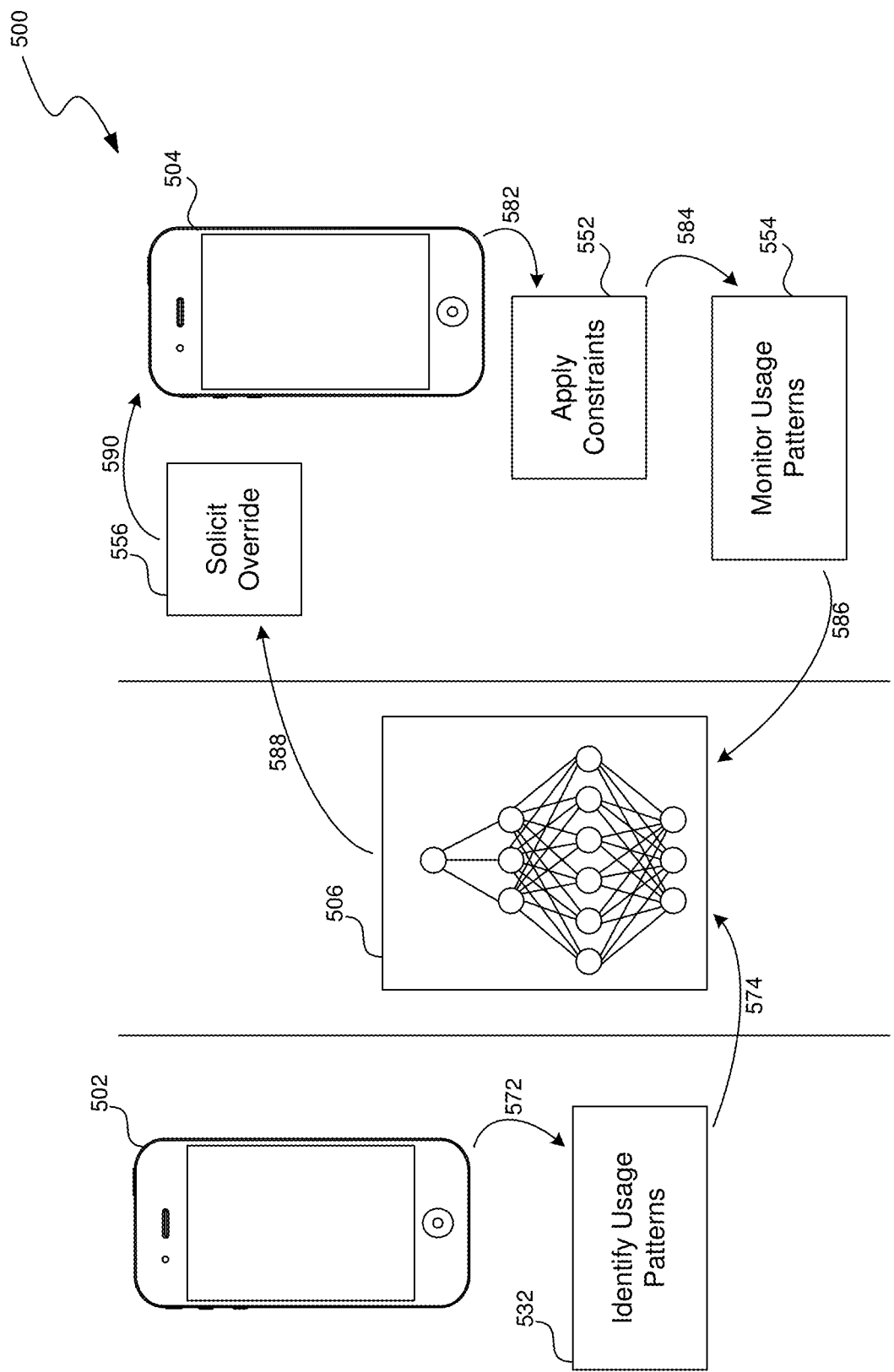
FIG. 5 is a conceptual diagram illustrating an example of entities and operations for learning an abnormal device usage pattern and disabling the device when the abnormal device usage pattern is detected.

FIG. 5 is a conceptual diagram illustrating an example 500 of entities and operations for learning an abnormal device usage pattern and disabling the device when the abnormal device usage pattern is detected. Example 500 includes stolen device 502, monitored device 504, and a neural network 506. Example 500 also shows software modules including a module 532 that identifies usage patterns to train the neural network 506, a module 552 that applies constraints, a module 554 that monitors usage patterns using neural network 506, and a module 556 that solicits deactivation overrides.

Example 500 begins with the module 532, at action 572, receiving usage conditions that were taken in relation to stolen device 502. These usage conditions are one set of many received from various stolen devices (not shown). In addition, other usage conditions from devices in normal operation are also obtained (also not shown). At action 574, these sets of usage conditions with corresponding labels for stolen or not stolen devices are provided to train neural network 506. The training can include providing the each set of usage conditions as input to the neural network 506 and adjusting parameters of the neural network 506 (e.g., using back propagation) based on how closely the output of the neural network 506 matches the label for that usage condition set.

Once trained, the neural network 506 can be used by device 504 in monitoring for an abnormal (stolen device) usage pattern. Example 500 continues at action 582, where module 552 checks constraints, such as to not monitor usage patterns when in safe zones, during a selected timeframe, and when the user has switched pattern monitoring off. When no constraints indicate that pattern monitoring is disabled, example 500 continues to action 584 where module 554 determines current usage conditions and provides them, at action 586, to trained neural network 506. At action 588, trained neural network 506 provides a determination whether the current usage conditions indicate an abnormal usage pattern. In this example, an abnormal usage pattern has been identified, so module 556 solicits an override from the user, in this case by locking the device and prompting the user for a master password previously set on the device. When a threshold of 20 seconds has elapsed without receiving the master password, example 500 continues to action 590, where the device 504 is disabled. In example 500, disabling the device includes disabling the processor, wiping the hard drive, and corrupting the memory of device 504. Device 504 is now much less useful to the thief and is much less of a security threat, having removed the confidential data it included.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:
   receiving, at a memory of a mobile device, data representative of a machine learning model trained to identify a usage pattern for the mobile device;
   evaluating a set of one or more constraints that specify one or more circumstances where abnormal pattern matching is disabled and, based on the evaluating, determining that no constraints, from the set of constraints, are active;
   in response to the determination that no constraints are active, determining, by applying the machine learning model to current usage conditions for the mobile device to identify the usage pattern for the mobile device, that an abnormal usage pattern is occurring;
   soliciting a disable override from a user of the mobile device; and
   in response to the determining that the abnormal usage pattern is occurring and that no disable override was received, permanently disabling one or more physical components of the mobile device,
   wherein the set of one or more constraints comprise unsafe dates where abnormal pattern matching is enabled; and
   wherein at least some of the unsafe dates are based on events automatically identified on a calendar of the user.

2. The method of claim 1,
   wherein the machine learning model is trained, based on observed activities of the user, to identify a normal usage pattern for the user; and
   wherein determining that the abnormal usage pattern is occurring comprises determining that an output from the machine learning model indicates the current usage conditions are below a threshold match for the normal usage pattern for the user.

3. The method of claim 1,
   wherein the machine learning model is trained to identify the abnormal usage pattern corresponding to usage conditions for stolen devices; and
   wherein determining that the abnormal usage pattern is occurring comprises determining that an output from the machine learning model indicates the current usage conditions are above a threshold match for the usage conditions for stolen devices.

4. The method of claim 1, wherein the current usage conditions comprise values for three or more of:
   identifications of locations;
   changes in settings;
   personal data access events;
   application usage amounts or sequences;
   IMU device movement patterns;
   a SIM card change event;
   purchase events; or
   any combination thereof.

5. The method of claim 1, wherein the set of one or more constraints comprise one or more of:
   safe geographic zones where abnormal pattern matching is disabled;
   safe times of day where abnormal pattern matching is disabled;
   safe dates where abnormal pattern matching is disabled; or
   any combination thereof.

6. The method of claim 1,
   wherein the set of one or more constraints comprise a manual activation of abnormal pattern matching; and
   wherein the manual activation of abnormal pattern matching was in response to a prompt provided to the user in response to automatic identification of conditions for which a heightened security risk exists.

7. The method of claim 1,
   wherein the machine learning model is a first machine learning model trained to identify usage conditions corresponding to a stolen device;
   wherein the method further comprises obtaining a second machine learning model trained to identify usage conditions corresponding to normal use by the user; and
   wherein the determining that the abnormal usage pattern is occurring comprises:
      applying the first machine learning model to the current usage conditions for the mobile device to generate a first value estimating a first likelihood that the current usage conditions correspond to the mobile device being stolen;
      applying the second machine learning model to the current usage conditions for the mobile device to generate a second value estimating a second likelihood that the current usage conditions correspond to normal device actions for the user;
      combining results that are based on the first and second values into a combined abnormal usage prediction; and
      determining that the combined abnormal usage prediction is above an abnormal usage pattern threshold.

8. The method of claim 7,
   wherein the method further comprises obtaining a third machine learning model trained to identify, based on providing the current usage conditions to the third machine learning model, weights between the results that are based on the first and second values; and
   wherein the combining of the results comprises:
      providing the current usage conditions to the third machine learning model to obtain the weights;
      applying the weights to the results that are based on the first and second values; and
      combining the weighted results into the combined abnormal usage prediction.

9. The method of claim 1, wherein at least the determining that the abnormal usage pattern is occurring and the permanently disabling the one or more physical components of the mobile device are controlled by a second processing component separate from a first processing component that executes an operating system of the mobile device.

10. The method of claim 1,
    wherein soliciting the disable override comprises sending a message to a computing system, other than the mobile device, and setting a timer for receiving the override; and
    wherein the permanently disabling the one or more physical components of the mobile device is performed in response to expiration of the timer.

11. The method of claim 1,
    wherein applying the machine learning model includes receiving a confidence value from the machine learning model specifying a likelihood that the abnormal usage pattern is occurring; and
    wherein permanently disabling the one or more physical components of the mobile device is in response to comparing the confidence value to a threshold over which the mobile device is permanently disabled and under which a non-permanent disabling of the mobile device is performed.

12. A computing system for disabling devices exhibiting an abnormal usage pattern, the computing system comprising:
- one or more processors; and
- one or more memories storing instructions that, when executed by the computing system, cause the one or more processors to perform operations comprising:
- receiving data representative of a machine learning model trained to identify the abnormal usage pattern;
- evaluating a set of one or more constraints that specify one or more circumstances where abnormal pattern matching is disabled and, based on the evaluating, determining that no constraints, from the set of constraints, are active;
- determining, in response to the determination that no constraints are active, by applying the machine learning model to current usage conditions for a device, that the abnormal usage pattern is occurring;
- soliciting a disable override from a user associated with the device; and
- in response to the determining that the abnormal usage pattern is occurring and that no disable override was received, permanently disabling one or more physical components of the device,
- wherein the set of one or more constraints comprise unsafe dates where abnormal pattern matching is enabled; and
- wherein at least some of the unsafe dates are based on events automatically identified on a calendar of the user.

13. The computing system of claim 12,
- wherein the machine learning model is trained to identify the abnormal usage pattern corresponding to usage conditions for stolen devices; and
- wherein determining that the abnormal usage pattern is occurring comprises determining that an output from the machine learning model indicates the current usage conditions are above a threshold match for the usage conditions for stolen devices.

14. The computing system of claim 12, wherein the current usage conditions comprise values for two or more of:
- identifications of locations;
- changes in settings;
- personal data access events;
- application usage amounts or sequences;
- IMU device movement patterns;
- a SIM card change event; or
- any combination thereof.

15. The computing system of claim 12, wherein the operations further comprise:
- evaluating a set of one or more constraints that specify one or more circumstances where abnormal pattern matching is disabled;
- based on the evaluating, determining that no constraints, from the set of constraints, are active and, in response, enabling abnormal usage pattern matching.

16. The computing system of claim 15, wherein the set of one or more constraints comprise one or more of:
- safe geographic zones where abnormal pattern matching is disabled;
- safe times of day where abnormal pattern matching is disabled;
- safe dates where abnormal pattern matching is disabled; or
- any combination thereof.

17. The computing system of claim 15,
- wherein the set of one or more constraints comprise a manual activation of abnormal pattern matching; and
- wherein the manual activation of abnormal pattern matching was in response to a prompt provided to the user in response to automatic identification of conditions for which a heightened security risk exists.

18. A non-transitory computer-readable storage medium storing instructions that, when executed by a computing system, cause the computing system to perform operations for disabling devices, the operations comprising:
- obtaining a machine learning model trained to identify a usage pattern;
- determining that no constraints, from a set of one or more constraints specifying circumstances where abnormal pattern matching is disabled, are active;
- in response to the determination that none of the constraints are active, determining, by applying the machine learning model to current usage conditions for a device to identify the usage pattern for a mobile device, that an abnormal usage pattern is occurring;
- soliciting a disable override from a user of the mobile device; and
- in response to the determining that the abnormal usage pattern is occurring and that no disable override was received, permanently disabling one or more physical components of the device,
- wherein the set of one or more constraints comprise unsafe dates where abnormal pattern matching is enabled; and
- wherein at least some of the unsafe dates are based on events automatically identified on a calendar of the user.

19. The computer-readable storage medium system of claim 18,
- wherein applying the machine learning model includes receiving a confidence value from the machine learning model specifying a likelihood that the abnormal usage pattern is occurring; and
- wherein disabling the device comprises permanently disabling the device in response to comparing the confidence value to a threshold over which the device is permanently disabled and under which a non-permanent disabling of the device is performed.

* * * * *